US012801794B2

(12) United States Patent
Wang et al.

(10) Patent No.: US 12,801,794 B2
(45) Date of Patent: Nov. 17, 2026

(54) EFFICIENT MULTIPLE GARBLED CIRCUIT PROTOCOL

(71) Applicant: Google LLC, Mountain View, CA (US)

(72) Inventors: Gang Wang, Frederick, MD (US); Marcel M. Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 125 days.

(21) Appl. No.: 18/857,971

(22) PCT Filed: Jul. 19, 2024

(86) PCT No.: PCT/US2024/038679
§ 371 (c)(1),
(2) Date: Oct. 18, 2024

(87) PCT Pub. No.: WO2025/019744
PCT Pub. Date: Jan. 23, 2025

(65) Prior Publication Data
US 2026/0187288 A1 Jul. 2, 2026

(30) Foreign Application Priority Data
Jul. 20, 2023 (IL) ......................................... 304615

(51) Int. Cl.
*G06F 21/72* (2013.01)
*G06F 21/60* (2013.01)

(52) U.S. Cl.
CPC ............ *G06F 21/72* (2013.01); *G06F 21/602* (2013.01)

(58) Field of Classification Search
None
See application file for complete search history.

(56) References Cited

U.S. PATENT DOCUMENTS 10,910,087 B2 2/2021 Cho et al.
10,917,235 B2 2/2021 Gama et al.
(Continued)

FOREIGN PATENT DOCUMENTS

EP 2663948 4/2016
WO WO 2023027982 3/2023

OTHER PUBLICATIONS

Github.com [online], "Dovekey_auction_secure_2pc_status_update.md" Nov. 2021, <https://github.com/google/ads-privacy/blob/master/proposals/dovekey/dovekey_auction_secure_2pc_status_update.md>, 6 pages.
(Continued)

*Primary Examiner* — Farid Homayounmehr
*Assistant Examiner* — Suman Debnath
(74) *Attorney, Agent, or Firm* — Fish & Richardson P.C.

(57) ABSTRACT

This document describes systems and techniques for using cryptography, secure MPC, garbled circuits, and oblivious transfer to select digital components in ways that preserve user privacy and protects the data of each party involved in the selection process. In one aspect, a method includes receiving, from a content platform by a first computer of a secure MPC system, a first garbled circuit for determining whether each of a first set of digital components satisfies a publication condition for display with a resource. The first computer evaluates the garbled circuit to obtain, for each digital component in the first set of digital components, a first secret share of a publication condition parameter that indicates whether the digital component satisfies the publication condition. The first computer generates a second garbled circuit for determining whether each digital component in a second set of digital components is eligible for display with the resource.

20 Claims, 5 Drawing Sheets

(56) References Cited

U.S. PATENT DOCUMENTS

| | | | | |
|---|---|---|---|---|
| 12,463,947 | B1 * | 11/2025 | Crockett | H04L 63/0428 |
| 2016/0020904 | A1 | 1/2016 | Ioannidis et al. | |
| 2019/0013950 | A1 | 1/2019 | Becker et al. | |
| 2022/0092216 | A1 | 3/2022 | Mohassel et al. | |
| 2023/0155820 | A1 * | 5/2023 | Wang | H04L 9/085 713/180 |
| 2023/0171091 | A1 | 6/2023 | Wang et al. | |

OTHER PUBLICATIONS

International Search Report and Written Opinion in International Appln. No. PCT/US2024/038679, mailed on Oct. 29, 2024, 17 pages.

Lindell, "Secure Multiparty Computation (MPC)" Cryptology ePrint Archive, 2020, 15 pages.

Wikipedia.org [online], "Garbled circuit" created on Sep. 2016, retrieved on Aug. 23, 2024, retrieved from URL <https://en.wikipedia.org/wiki/Garbled_circuit#:~:text-Garbled%20circuit%20is%20a%20cryptographic,described%20as%20a%20Boolean%20circuit.>, 7 pages.

Wikipedia.org [online], "Man-in-the-middle attack" created on Nov. 2022, retrieved on Aug. 23, 2024, retrieved from URL <https://en.wikipedia.org/wiki/Man-in-the-middle attack>, 7 pages.

Wikipedia.org [online], "Oblivious Transfer" created on Mar. 2004, retrieved on Aug. 23, 2024, retrieved from URL <https://en.wikipedia.org/wiki/Oblivious_transfer>, 5 pages.

Wikipedia.org [online], "Secure Multi-Party Computation" created on May 10, 2004, retrieved on Aug. 23, 2024, retrieved from URL <https://en.wikipedia.org/wiki/Secure_multi-party_computation>, 13 pages.

Yakoubov et al., "A Gentle Introduction to Yao's Garbled Circuits" preprint on webpage at https://web.mit.edu/sonka89/www/papers/2017ygc.pdf, 2017, 12 pages.

International Preliminary Report on Patentability in International Appln. No. PCT/US2024/038679, mailed on Jan. 29, 2026, 10 pages.

* cited by examiner

EFFICIENT MULTIPLE GARBLED CIRCUIT PROTOCOL

CROSS-REFERENCE TO RELATED APPLICATIONS

This application is a National Stage Application under 35 U.S.C. § 371 and claims the benefit of International Application No. PCT/US2024/038679, filed Jul. 19, 2024, which claims priority to Israel Application No. 304615, filed on Jul. 20, 2023, the entire contents of which are hereby incorporated herein by reference.

TECHNICAL FIELD

This specification is related to cryptography, including garbled circuits, secure multi-party computation, and oblivious transfer.

BACKGROUND

Secure multi-party computation (MPC) is a family of cryptographic protocols that prevents access to data by distributing a computation across multiple parties such that no individual party can access another party's data or intermediate computed values, while outputs are released only to designated parties. The MPC computing systems typically perform the computations using secret shares or other encrypted forms of the data and secure exchange of information between the parties.

SUMMARY

In general, one innovative aspect of the subject matter described in this specification can be embodied in methods that include receiving, from a content platform and by a first computer of a secure multi-party computation (MPC) system that includes multiple of computers, a first garbled circuit for determining whether each digital component of a first set of digital components satisfies a publication condition for display with a resource that is being displayed at a client device to a user; evaluating, by the first computer, the garbled circuit to obtain, for each digital component in the first set of digital components, a first secret share of a publication condition parameter that indicates whether the digital component satisfies the publication condition; generating, by the first computer, a second garbled circuit for determining whether each digital component in a second set of digital components is eligible for display with the resource, the second garbled circuit being generated based at least in part on (i) the first secret share of the publication parameter for each digital component in the first set of digital components and (ii) one or more additional eligibility conditions for each digital component in the second set of digital components; sending, by the first computer, the second garbled circuit to a second computer of the secure MPC system, wherein the second computer is configured to evaluate the garbled circuit to obtain, for each digital component, a second secret share of an eligibility parameter that indicates whether the digital component is eligible for display with the resource, and wherein the first computer stores a first secret share of the eligibility parameter for each digital component; generating, in collaboration with the second computer and based at least in part on the first secret share and the second secret share of the eligibility parameter for each digital component in the second set of digital components, secret shares of a selection result that indicates a selected digital component that is selected from a subset of the second set of digital components that are eligible for display with the resource; and sending, by the first computer, a first secret share of the selection result to the client device of the user. Other implementations of this aspect include corresponding apparatus, systems, and computer programs, configured to perform the aspects of the methods, encoded on computer storage devices.

These and other implementations can each optionally include one or more of the following features. In some aspects, the second computer is configured to send a second secret share of the selection result to the client device and the client device is configured to combine the first secret share of the selection result with the a second secret share of the selection result to obtain the selected digital component.

In some aspects, the second computer receives, for each digital component in the first set of digital components, a second secret share of the publication parameter.

In some aspects, the one or more additional conditions for at least one digital component includes a user group membership condition that is satisfied when the user is a member of a user group included in distribution criteria for the at least one digital component.

In some aspects, the second secret share of the eligibility result for each digital component in the second set of digital components includes an output label of a portion of the second garbled circuit for the digital component and the first secret share of the eligibility result for each digital component in the second set of digital components includes an output value corresponding to the output label of the portion of the second garbled circuit for the digital component.

In some aspects, generating secret shares of the selection result that indicates a selected digital component that is selected from a subset of the second set of digital components that are eligible for display with the resource includes performing a private information retrieval operation to select the selected digital component based on the first secret share and the second secret share of the eligibility parameter for each digital component in the second set of digital components.

In some aspects, generating secret shares of the selection result that indicates a selected digital component that is selected from a subset of the second set of digital components that are eligible for display with the resource includes selecting the selected digital component from among the subset of the second set of digital components based on a selection value for each digital component in the subset of the second set of digital components.

The subject matter described in this specification can be implemented in particular embodiments so as to realize one or more of the following advantages. Using a secure MPC process performed by two or more computers of a secure MPC system operated by different parties to select digital components based on shares of user information ensures that the user information cannot be accessed in cleartext by either MPC computer or another party absent unauthorized collusion between the MPC computers. In this way, as long as at least one MPC server is honest, user data privacy is preserved. The secure MPC process can also use shares of information received from content platforms in the digital component selection to preserve the confidentiality of the content platforms' information such that the information is not accessible by either MPC computer or another entity that somehow obtains a share of the information.

In a digital component selection process, the MPC servers can select from eligible digital components that satisfy one or more eligibility conditions while preventing the parties from accessing user information in cleartext. The eligibility conditions can include restrictions and guidelines on the manner or frequency of distribution of a digital component, among other factors. The conditions can include user group membership, frequency control, muting (e.g., user blocking), k-anonymity for preventing micro-targeting of users, and/or pacing and budget constraints.

Another example eligibility condition relates to the context in which the digital component will be presented, e.g., the resource with which the digital component will be displayed, the geographic location of the client device that will display the digital component, and the spoken language setting of an application (e.g., browser) that will display the digital component. Digital component providers can also specify the context in which their digital components can and/or cannot be displayed. Similarly, resource publishers can specify features of digital components that can or cannot be displayed with their resources. Rather than use cache lookup keys that account for all the possible combinations of properties that can be used to identify digital components that are eligible for each digital component display opportunity that has its associated context, the criteria for a digital component can be defined using an expression that can be evaluated by the MPC computers, e.g., in secret shares using a secure MPC process. In this way, the amount of data stored by the MPC computers is reduced relative to the use of large cache lookup keys. This also increases the flexibility in the publisher and digital component provider control over the display of digital components, without increasing the data storage requirements of the MPC computers, which enables the MPC computers to store more digital components, information for the digital components, and/or other related information in high speed memory, e.g., in high speed caches.

As the selection of digital components is an online process that typically occurs at the time that content is being loaded at a client device, it is important that this process be completed quickly, e.g., within milliseconds. The techniques described in this document enhances the speed at which digital components are selected by reducing the size of data transmitted between the client device and the MPC cluster, by reducing the computational resources required by the MPC cluster, and by reducing the number of roundtrip communications performed by the servers of the MPC cluster and the size of data transmitted between the servers. The reduction in data size between the client device and server also reduces network bandwidth consumption and battery consumption of the client device, e.g., if the client device is a mobile device running on battery power. For example, the client device can encode user data using probabilistic data structures (e.g., Bloom filters and/or cuckoo filters), which are compact representations of data, to reduce the amount of data sent from the client device to the MPC computers and to prevent access to the user data.

The MPC cluster can transmit secret shares of a result that identifies a selected digital component that the MPC cluster selected using the secure MPC process. By sending secret shares of a result for only selected digital components rather than information for all or a large set of digital components similarly reduces latency and consumed bandwidth, processing power, and battery power in transmitting and receiving the result. This also reduces the potential leakage of confidential information of content platforms that submit selection values for digital components to the MPC cluster by limiting the number of digital components for which information is provided to the client device.

Reducing the latency in content presentation also reduces the number of errors that occur at user devices while waiting for such content to arrive. As the content often needs to be provided in milliseconds and to mobile devices connected by wireless networks, reducing the latency in selecting and providing the content is critical in preventing errors and reducing user frustration.

The MPC cluster can use multiple garbled circuits to protect sensitive information of users and of content platforms and/or publishers. For example, to evaluate confidential conditions of content platforms or publishers, the content platform or publisher can be one party of an MPC process for generating and evaluating a first garbled circuit for determining whether digital components satisfy the confidential conditions. One or more MPC computers can act as the other party(s) of the MPC process. This protects the confidential conditions of the content platform or publisher from other parties of the process and user information that is evaluated based on the conditions. Two or more MPC computers can use the results of the first garbled circuit to generate and evaluate a second garbled circuit for determining whether the digital components are eligible based on additional conditions, which can also include user-based conditions. This also protects the confidentiality of the user information. Using multiple garbled circuits in this way enhances user and publisher confidentiality, while also reducing latency in selecting digital components and reducing the computational resources used to select the digital components relative to other secure MPC techniques that would require more computations and round-trip communications between the MPC computers to evaluate the various conditions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, this document describes systems and techniques for using cryptography, secret sharing, secure MPC, garbled circuits, and oblivious transfer to select digital components in ways that preserve user privacy and protects the security of data of each party that is involved in the selection process. Two or more MPC computers can execute a secure MPC protocol that includes garbled circuits and use private information retrieval (PIR) techniques to select a digital component based on in part of user data and provide secret shares of a selected digital component to a client device in ways that prevent either MPC computer from accessing the user data or the selected digital component in cleartext. In addition, a content platform can perform a secure MPC protocol that includes garbled circuits to evaluate confidential conditions of the content platform and/or a publisher of a resource with which a digital component will be displayed. Secret shares of the results of this evaluation can be used to generate and evaluate the garbled circuit for selecting the digital component.

The techniques described in this document allow for such privacy preservation and data security while still providing digital components in short time periods, e.g., within milliseconds, after a request is received and while minimizing the size of data sent to and from the client device that displays the digital component. The techniques also provide flexibility and security of rules and other data specified by content platforms, publishers, and/or digital component providers for controlling the environments in which digital components are displayed and the digital components that are displayed with particular electronic resources, e.g., web pages and/or native application content.

Figure 1:
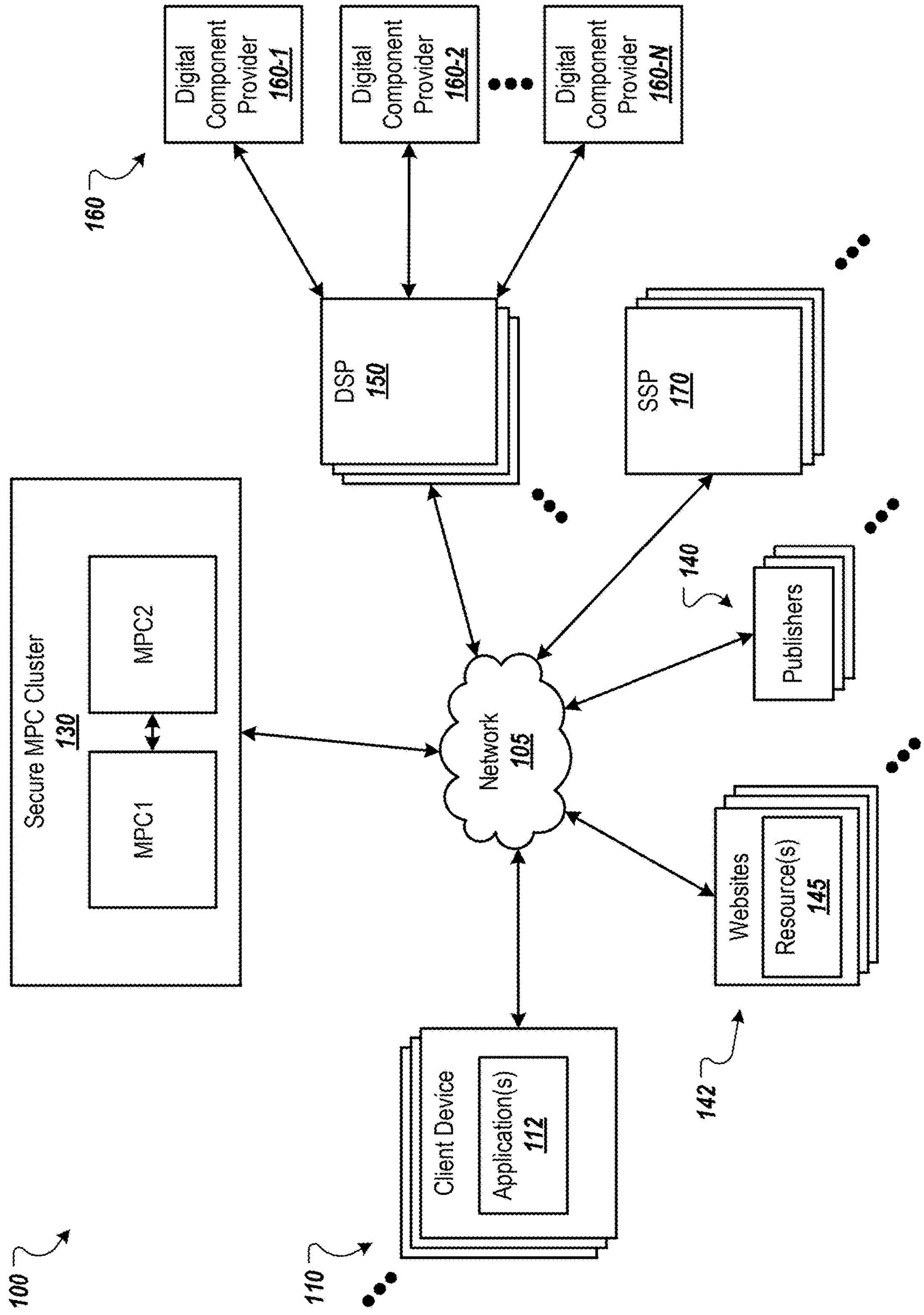
FIG. 1 is a block diagram of an environment in which an MPC cluster performs secure MPC processes to select digital components for distribution to client devices.

FIG. 1 is a block diagram of an environment 100 in which an MPC cluster 130 performs secure MPC processes to select digital components for distribution to client devices 110. The example environment 100 includes a data communication network 105, such as a local area network (LAN), a wide area network (WAN), the Internet, a mobile network, or a combination thereof. The network 105 connects the client devices 110, the secure MPC cluster 130, publishers 140, websites 142, content platforms, e.g., supply-side platforms (SSPs) 170 and demand-side platforms DSPs (150). The example environment 100 can include many different client devices 110, secure MPC clusters 130, publishers 140, websites 142, DSPs 150, and SSPs 170.

A website 142 includes one or more electronic resources 145. The resources 145 can be associated with a domain name, a resource identifier unique within the domain such as a path, and hosted by one or more servers. An example website is a collection of web pages formatted in hypertext markup language (HTML) that can contain text, images, multimedia content, and programming elements, such as scripts. Each website 142 is maintained by a content publisher 140, which is an entity that controls, manages and/or owns the website 142.

A resource 145 is any data that can be provided by the publisher 140 over the network 105 and can be associated with a resource address. Resources include HTML pages, word processing documents, and portable document format (PDF) documents, images, video, and feed sources, to name just a few. The resources 145 can include content, such as words, phrases, pictures, and so on, and may include embedded information (e.g., meta information and hyperlinks) and/or embedded instructions, e.g., scripts.

A client device 110 is an electronic device that is capable of communicating over the network 105. Example client devices 106 include personal computers, gaming devices, mobile communication devices, digital assistant devices, augmented reality devices, virtual reality devices, and other devices that can send and receive data over the network 105. A client device 110 can also include a digital media device, e.g., a streaming device that plugs into a television or other display to stream videos to the television.

A gaming device is a device that enables a user to engage in gaming applications, for example, in which the user has control over one or more characters, avatars, or other rendered content presented in the gaming application. A gaming device typically includes a computer processor, a memory device, and a controller interface (either physical or visually rendered) that enables user control over content rendered by the gaming application. The gaming device can store and execute the gaming application locally, or execute a gaming application that is at least partly stored and/or served by a cloud server (e.g., online gaming applications). Similarly, the gaming device can interface with a gaming server that executes the gaming application and "streams" the gaming application to the gaming device. The gaming device may be a tablet device, mobile telecommunications device, a computer, or another device that performs other functions beyond executing the gaming application.

Digital assistant devices include devices that include a microphone and a speaker. Digital assistant devices are generally capable of receiving input by way of voice, and respond with content using audible feedback, and can present other audible information. In some situations, digital assistant devices also include a visual display or are in communication with a visual display (e.g., by way of a wireless or wired connection). Feedback or other information can also be provided visually when a visual display is present. In some situations, digital assistant devices can also control other devices, such as lights, locks, cameras, climate control devices, alarm systems, and other devices that are registered with the digital assistant device.

A client device 110 typically includes applications 112, such as web browsers and/or native applications, to facilitate the sending and receiving of data over the network 105. A native application is an application developed for a particular platform or a particular device, e.g., for mobile devices having a particular operating system. Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for displaying digital components with the resources 145 or application pages. As used throughout this document, the phrase "digital component" refers to a discrete unit of digital content or digital information (e.g., a video clip, audio clip, multimedia clip, gaming content, image, text, bullet point, artificial intelligence output, language model output, or another unit of content). A digital component can electronically be stored in a physical memory device as a single file or in a collection of files, and digital components can take the form of video files, audio files, multimedia files, image files, or text files and include advertising information, such that an advertisement is a type of digital component.

For example, the digital component may be content that is intended to supplement content of a web page, application content (e.g., an application page), or other resource displayed by the application 112. More specifically, the digital component may include digital content that is relevant to the resource content, e.g., the digital component may relate to the same topic as the web page content, or to a related topic. The provision of digital components can thus supplement, and generally enhance, the web page or application content.

When the application 112 loads a resource (or application content) that includes one or more digital component slots, the application 112 can request a digital component for each slot. In some implementations, the digital component slot can include code, e.g., one or more scripts, that, when processed by the application 112, cause the application 112 to request a digital component for display to a user of the client device 110. As described below, the application 112 can request digital components from the MPC cluster 130 and/or one or more SSPs 170.

Some publishers 140 use an SSP 170 to manage the process of obtaining digital components for digital component slots of its resources 145 and/or applications 112. An SSP 170 is a technology platform implemented in hardware and/or software that automates the process of obtaining digital components for the resources and/or applications. Each publisher 140 can have a corresponding SSP 170 or multiple SSPs 170. Some publishers 140 may use the same SSP 170.

Digital component providers 160 can create (or otherwise publish) digital components that are displayed in digital component slots of publishers' resources 145 and applications 112. For example, a digital component provider 160 can create digital components that include content related to the digital component provider 160. In a particular example, a digital component of a product manufacturer can include content related to the product.

The digital component providers 160 can use a DSP 150 to manage the provisioning of its digital components for display in digital component slots. A DSP 150 is a technology platform implemented in hardware and/or software that automates the process of distributing digital components for display with the resources and/or applications. A DSP 150 can interact with multiple SSPs 170 on behalf of digital component providers 160 to provide digital components for display with the resources 145 and/or applications 112 of multiple different publishers 140. In general, a DSP 150 can receive requests for digital components (e.g., from an SSP 170), generate (or select) a selection value for one or more digital components created by one or more digital component providers 160 based on the request, and provide data related to the digital component (e.g., the digital component itself, or a creative element that includes code that enables the digital component to be downloaded) and the selection value to an SSP 170. The selection value can be an amount that the digital component provider 160 is willing to provide, e.g., to a publisher of a resource, for display or user interaction with the digital component, e.g., when presented with the resource. The SSP 170 can then select a digital component for display at a client device 110 and provide, to the client device 110, data that causes the client device 110 to display the digital component, e.g., by providing the digital component or the code that enables download of the digital component. As described in more detail below, the MPC cluster 130 can select digital components for the client device 110 to display in a manner that preserves user privacy.

In some cases, it is beneficial to a user to receive digital components related to web pages, application pages, or other electronic resources previously visited and/or interacted with by the user. In order to distribute such digital components to users, the users can be assigned to user groups, e.g., user interest groups which include users determined or predicted to have an interest in a topic of the group, cohorts of similar users (e.g., that have performed similar actions or visited similar electronic resources, or other group types involving similar user data or similar interests. For example, users can be added to user groups when the users visit particular resources or perform particular actions at the resource (e.g., interact with a particular item displayed on a web page or add the item to a virtual cart). The user groups can be generated and updated by the digital component providers 160. That is, each digital component provider 160 can assign users to their user groups when the users visit electronic resources of the digital component providers 160. The user groups can also be created by and/or updated by the content platforms, e.g., by DSPs 150 and/or SSPs 170.

To protect user privacy, a user's group membership can be maintained at the user's client device 110, e.g., by one of the applications 112, the operating system of the client device 110, or another trusted program rather than by a digital component provider, content platform, or other party. In a particular example, a trusted program (e.g., a web browser or the operating system) can maintain a list of user group identifiers ("user group list") for a user using the web browser or another application (e.g., for a user logged into the browser, application, or the client device 110). The user group list can include a user group identifier for each user group that includes the user as a member. The digital component providers 160 or content platforms that create the user groups can specify the user group identifiers for their user groups. The user group identifier for a user group can be descriptive of the group (e.g., gardening group) or a code that represents the group (e.g., an alphanumeric sequence that is not descriptive). The user groups can include interest-based groups that each include users that are determined to have, or has expressed, an interest in a topic of the user group. The user group list for a user can be stored in secure storage at the client device 110 and/or can be encrypted when stored to prevent others from accessing the list.

When the application 112 displays a resource (e.g., web page, application content, or digital component related to a digital component provider 160), the resource can request that the application 112 add one or more user group identifiers to the user group list. In response, the application 112 can add the one or more user group identifiers to the user group list and store the user group list securely. For example, a web page at which a user selects to view more information about a particular item can add the user to a user group related to the particular item.

In some implementations, the MPC cluster 130 can use the user group membership of a user to select digital components that may be of interest to the user or may be beneficial to the user/user device in another way. For example, such digital components or other content may include data that improves a user experience, improves the running of a user device, or benefits the user or client device 110 in some other way. However, the user group identifiers of the user group list of a user can be provided and used to select digital components in ways that prevent the computing systems MPC1 and MPC2 of the MPC cluster 130 from accessing the user group identifiers for the user in cleartext, thereby preserving user privacy when using user group membership data to select digital components. The MPC cluster 130 can also use other conditions to select digital components, as described in more detail below. Cleartext is text that is not computationally tagged, specially formatted, or written in code, or data, including binary files, in a form that can be viewed or used without requiring a key or other decryption device, or other decryption process.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, postal code, or state level), so that a particular location of a user cannot be determined. Thus, the user may have control over what information is collected about the user, how that information is used, and what information is provided to the user.

The example secure MPC cluster 130 includes two computing systems MPC1 and MPC2 that perform secure MPC processes to select digital components for distribution to client devices of users, e.g., based on the user's group membership and/or contextual data (e.g., contextual properties of an environment in which a selected digital component will be displayed), but without accessing the group membership, contextual data, or other user information, or signals derived from such user information, in cleartext. Although the example MPC cluster 130 includes two computing systems, more computing systems can also be used as long as the MPC cluster 130 includes more than one computing system. For example, the MPC cluster 130 can include three computing systems, four computing systems, or another appropriate number of computing systems. Using more computing systems in the MPC cluster 130 can provide more security, but can also increase the complexity of the MPC processes. Each computing system MPC1 and MPC2 can be a server or other appropriate type of computer.

The computing systems MPC1 and MPC2 can be operated by different entities. In this way, each entity may not have access to the users' group membership, or other user information, or signals derived from such user information, in cleartext. For example, one of the computing systems MPC1 or MPC2 can be operated by a trusted party different from the users, the publishers 140, the DSPs 150, the SSPs 170, and the digital component providers 160. For example, an industry group, governmental group, or browser developer can maintain and operate one of the computing systems MPC1 and MPC2. The other computing system can be operated by a different one of these groups, such that a different trusted party operates each computing system MPC1 and MPC2. Advantageously, the different parties operating the different computing systems MPC1 and MPC2 may have no incentive to collude to endanger user privacy. In some implementations, the computing systems MPC1 and MPC2 are separated architecturally and are monitored to not communicate with each other outside of performing the secure MPC processes described in this document.

Each computing system MPC1 and MPC2 can store digital components (e.g., the creatives for the digital components), selection values for digital components, and other information for digital components. For example, the computing systems MPC1 and MPC2 can cache selection values previously received from SSPs 170 and/or DSPs 150 as part of previous digital component selection processes or that are otherwise provided to the computing systems MPC1 and MPC2, e.g., that are provided in advance for use in digital component selection processes. In this way, the MPC cluster 130 can use the selection values to select digital components for distribution to client devices 110 in response to future digital component requests received from client devices 110.

A digital component for which a selection value and other information is stored by the MPC cluster 130 for digital component selection processes can be referred to as a stored digital component in this document. However, the digital component itself is not necessarily stored by the MPC cluster 130. Instead, the MPC cluster 130 can store data, e.g., code that references a network location from which the digital component can be downloaded, for each stored digital component. In some implementations, the digital component itself is stored, and is returned to the application 112 directly, by the MPC cluster 130. Such implementation reduces the need for application 112 to fetch the digital components, and/or other information for digital components, in additional requests that may consume battery and bandwidth of the device, and may leak additional signals for the server hosting the digital component itself to track the device.

For each stored digital component, each computing system MPC1 and MPC2 can store a selection value or a vector of values that can be used by the computing systems MPC1 and MPC2 to determine a selection value for the digital component. A selection value for a digital component can be based on the context in which the digital component will be displayed and or user data related to a user to which the digital component will be presented (e.g., whether the user is a member of a particular user group). For example, a digital component provider 160 may be willing to provide a higher selection value for its digital component to be displayed on resources related to a particular topic (e.g., a web page related to travel) than for other topics, e.g., if the digital component is related to the particular topic. As another example, a digital component provider 160 may be willing to provide a higher selection value for its digital component to be displayed to users who have certain characteristics, interests (e.g., member of a particular user interest group), intentions, previous interactions with digital components, etc. Thus, a DSP 150 can provide, to the computing systems MPC1 and MPC2, multiple selection values (or multiple selection value vectors) for a given digital component, with each selection value or vector being for different combinations of contextual and/or user properties.

Each selection value or vector and its corresponding digital component can be referred to as a digital component selection item. A digital component selection item can include the digital component itself, the selection value or vector, the information for the digital component (e.g., the metadata for the digital component), and/or an eligibility expression that defines a relationship between a set of conditions.

The eligibility expression is used to determine whether the digital component selection item is eligible for distribution to a client device 110 based on one or more conditions that can be related to context and/or user data. The eligibility criteria is the criteria for the eligibility expression. The eligibility expression can be in the form of a Boolean expression that includes multiple sub-expressions and Boolean operators between the sub-expressions. An example eligibility expression can be: URL=example.com AND location=United States. Another example, is user is a member of a user group designated by the digital component AND the digital component is not on a block list for the user. A DSP 150 can provide, to the computing systems MPC1 and MPC2, the eligibility expression for a digital component and corresponding selection value (or data, such as one or more vectors, that can be used to determine a selection value), e.g., as part of the digital component selection item. Example eligibility expressions, eligibility criteria, and techniques for evaluating the eligibility expressions are described below.

Various conditions can be included in an eligibility expression for a digital component. One example condition is that the user to which a selected digital component will be provided is a member of a user group corresponding to the stored digital component. This condition can be referred to as a user group membership condition. In this example, the computing systems MPC1 and MPC2 can store, for a digital component selection item (e.g., as part of the selection item), a set of one or more user group identifiers that correspond to the digital component. These user group identifiers identify the user groups for which the stored digital component can be provided. That is, the digital component selection item is only eligible for a digital component selection process that is performed to select a digital component to provide to a user that is a member of at least one of the user groups identified by the set of one or more user group identifiers for the digital component selection item.

Another example condition for a stored digital component is a frequency cap condition that indicates that the digital component, or digital components of a particular category, can only be provided to the same user a maximum number of times over a given time duration. Another example condition for a digital component is a blocked digital component condition that indicates that the digital component has been blocked, e.g., muted, by a user. For these example conditions, the computing systems MPC1 and MPC2 can receive and store, for each of multiple users, a probabilistic data structure, e.g., a cuckoo filter or Bloom filter, that represents digital components that cannot be provided to the user. For example, the probabilistic data structure can represent universal identifiers for digital components that are blocked either by the user directly or due to the frequency at which the digital component is displayed to the user being exceeded during the given time duration. The blocked digital component identifiers can also be referred to as a block list for the user.

The computing systems MPC1 and MPC2 can receive the probabilistic data structures from the client devices 110 of the users, e.g., in an encrypted form that prevents either computing system MPC1 or MPC2 from accessing the identifiers in cleartext. For example, the application 112 running on a user's client device 110 can generate a Bloom filter that represents the identifiers for the blocked digital components that are blocked due to frequency capping or blocked by the user. The application 112 can then provide data to each computing system MPC1 and MPC2 that enable the computing systems MPC1 and MPC2 to collaboratively query the Bloom filter using a secure MPC process to determine whether a given digital component is blocked for the user. The computing systems MPC1 and MPC2 calculate secret shares of a blocked digital component condition using this secure MPC process.

In some implementations, the identifiers for the blocked digital components can be included in the same probabilistic data structure as the user group identifiers and queried using either the same or different sets of hash functions. However, the target false positive rate for the blocked digital components can be lower than the false positive rate for the user group identifiers. Thus, fewer hash functions can be used to generate and query a Bloom filter for blocked digital components than for user group identifiers. To reduce the data size of the Bloom filter for the blocked digital components, the user group identifiers can be represented by a different Bloom filter than the blocked digital components. This reduces latency in sending the Bloom filters over a network, reduces consumed bandwidth in sending the Bloom filters, and reduces battery power usage to send the Bloom filters.

Another example condition for a stored digital component is a pacing condition that paces the distribution of the digital component over a time duration. The computing systems MPC1 and MPC2 can store data that indicates the total number of times the digital component can be provided over a time duration and/or a maximum budget for the digital component for the time duration. The computing systems MPC1 and MPC2 can use this information to pace how often the digital component can be a candidate for digital component selection processes based on this condition (e.g., all conditions for the digital component would have to be satisfied for the digital component to be a candidate). In some implementations, the computing systems MPC1 and MPC2 can implement a feedback controller, e.g., a proportional-integral-derivative (PID) controller, using secret shares and secure MPC to pace stored digital components that have a pacing condition.

In this example, the computing systems MPC1 and MPC2 can store the setpoint for the PID controller for a digital component and maintain the measured variable for the PID controller for the digital component. In general, a PID controller is a feedback controller that uses an error value, which is a difference between a target setpoint and a measured variable, to determine an output that drives the measured variable towards the setpoint. In the context of pacing the distribution of digital components to client devices, the setpoint for a digital component can be an impression rate, an interaction rate, a conversion rate, and/or a resource depletion rate (e.g., a budget spend rate). Similarly, the measured variable can be an impression rate, an interaction rate, a conversion rate, and/or a resource depletion rate over a given time duration. The computing systems MPC1 and MPC2 can also store the tuning parameters for each PID controller. The setpoint, measured variable, and tuning parameters can be stored in secret shares (with each computing system MPC1 and MPC2 storing a corresponding share of each parameter) or in cleartext depending on the target privacy/data security.

Another example condition is a k-anonymity condition. A k-anonymity condition can include a k-anonymity rule that requires that a digital component be eligible (or would have been selected) for distribution to at least k users over a given duration of time. The concept of k-anonymity ensures that data for a particular user is not distinguishable from the data of a threshold number k of other users. The system can enforce a k-anonymity rule, for example, by ensuring that a particular digital component is distributed to a client device 110 in response to a request for one or more digital components, and the same digital component could have been, or was, displayed to a set of at least k users or by at least k applications 112 within a particular period of time. In some implementations, each of the k applications 112 to which the digital component could have been, or was distributed must be for a different user. In this example, the computing systems MPC1 and MPC2 can store, for a digital component, the value k and maintain a number of users to which the digital component could have been distributed.

To determine the number of users that a digital component could have been displayed can include executing a counterfactual digital component selection process in parallel with each actual digital component selection process. In this counterfactual digital component selection process, all digital components can be candidates if they satisfy all conditions other than the k-anonymity condition. If the digital component is selected for at least k users or applications 112 in the counterfactual digital component selection processes, the digital component would have been displayed to k users if not for the k-anonymity condition. Once this happens, the digital component satisfies the k-anonymity condition can be included in the actual digital component selection processes (assuming the other conditions, if any, for the digital component are satisfied), which does not include digital components that have an unsatisfied k-anonymity condition.

In some implementations, each digital component selection item is stored in the form of a digital component information element dc_information_element, which can be a byte array having the selection value and other information for the digital component, e.g., including the creative itself or a resource locator from which client devices 110 can download the digital component. The byte array can have a particular format that applications 112 or trusted programs of client devices 110, and the computing systems MPC1 and MPC2 can parse to obtain the selection value and metadata. In some implementations, the digital component information element can include the digital component itself.

Publishers 140, DSPs 150, and/or digital component providers can also condition the eligibility of digital components to be displayed with resources of the publishers 140. For example, a publisher 140 may not want digital components that have particular types of content being displayed to users in particular geographic locations. In another example, a digital component provider 160 may not want its digital components to be displayed with particular resources (e.g., resources having a particular URL) or with resources having particular content. Conditions on the eligibility of the display of digital components with resources can be referred to as publication conditions.

The publication condition can be in the form of a Boolean expression, similar to that of the eligibility expressions described above. An example publication condition generated by a publisher 140 can be: Content=shoes AND location=United States. In this example, if the expression evaluates to a value or True or one for a given digital component (e.g., a digital component that includes content related to shoes and the user is in the United States, the digital component may not be eligible for display with the resource of the publisher 140. An example publication condition generated by a content platform (e.g., on behalf of a digital component provider 160) can be: URL=example.com OR content=hockey. In this example, the digital component may not be eligible for display with resources at example.com or that include hockey related content.

These publication conditions may be confidential such that the entity having the condition may not want to share the conditions with other parties or devices, including client devices 110, secure MPC clusters 130, etc. To protect the confidentiality of publication conditions, content platforms (e.g., DSPs 150 and/or SSPs 170) can be configured to perform a secure MPC process to evaluate the conditions with at least one computing system of the MPC cluster 130. For brevity, this secure MPC process is described herein as being performed with MPC1, but can also be performed with MPC2 or multiple computing systems of the MPC cluster 130.

The result of this secure MPC process can be secret shares of publication condition parameters for one or more digital components of the content platform. The publication condition parameter for a digital component indicates whether the digital component is eligible for display with a resource for which a digital component request has been received by the content platform. For example, the publication condition parameter can be a bit with a value of one if the digital component is eligible for display with the resource or a value of zero if the digital component is not eligible for display with the resource. Other values and/or representations of values (e.g., Boolean True and False values) can also be used.

These secret shares can be used as inputs to the eligibility expressions described above. For example, one of the conditions of an eligibility expression for a digital component (or all digital components) can be the result of the publication condition. In this example, the digital component is eligible if the publication condition parameter has a value of one and each other condition of the eligibility condition is satisfied.

The SSPs 170 can be configured to perform secure MPC processes with MPC1 to evaluate publication conditions generated by publishers. Similarly, the DSPs 150 can be configured to perform secure MPC processes MPC1 to evaluate publication conditions. If the SSP 170 sends a digital component request to multiple DSPs 150, each DSP 150 can perform the secure MPC process with MPC1 to evaluate the publication conditions for its digital components, e.g., its digital components stored at the MPC cluster 130 and any digital components being provide to the MPC cluster 130 in response to the digital component request.

At the end of this secure MPC process, the content platform can have a first secret share of the publication condition parameter for each of its digital components and MPC1 can have a second secret share of the publication parameter for its digital components. The content platform can provide each first secret share to MPC2. In some implementations, the content platform can encrypt the first secret shares using an encryption key (e.g., public key) for which MPC2 has a decryption key (e.g., private key). In this way, the content platform can provide the encrypted secret shares with its normal responses to the digital component request and the encrypted secret shares will be sent to MPC2 without MPC1 or any other entity being able to access the secret shares in cleartext.

In this document, some computations can be performed over secret shares by the MPC cluster 130 using products and/or sums of secret share values. For example, some computations used to compute a selection result using PIR can be performed based on secret shares held by MPC1 and MPC2. To increase the speed at which these computations are performed, multiplications can be performed in secret shares using AND operations, e.g., bitwise-AND, and additions can be performed in secret shares using XOR operations, e.g., bitwise-XOR operations. In some cases, when one cleartext integer is multiplied by a secret share representing zero or one in Z2 (i.e., the sum of the two shares modulo 2 is either zero or one), no multiplication or bitwise-AND is needed. Instead, each computing system can evaluate its share and return the integer if its share is one and zero if its share is zero.

In some implementations, the computations and comparisons are performed using garbled circuits to increase the speed at which the computations and computations are performed. A garbled circuit can include circuits for determining whether digital components are eligible based on one or more conditions and for selecting a digital component from among the eligible digital components for distribution to the client device 110.

Garbled circuits provide a technique for secure MPC that enables parties that each have a private input to evaluate a functionality on their joint inputs revealing only the output of the evaluation. Garbled circuits use a Boolean circuit representation of the functionality and different constructions provide different communication and computation trade-offs depending on the gates of the Boolean circuit that is being evaluated. The evaluation of a garbled circuit involves a garbler that generates the garbled circuit and an evaluator that evaluates the garbled circuit.

In general, a garbled circuit is based on a Boolean circuit with one or more logic gates that perform Boolean functions, such as AND gates, OR gates, XOR gates, etc. Each gate has one or more inputs and an output. The garbler encrypts the Boolean circuit to obtain a garbled circuit and assign two labels to each input of each gate, one for a value of 1 and one for a value of zero. Each label can be a random value. The garbler can then generate a truth table that includes the labels for the inputs and, for each possible set of input values represented by the labels, an output label. The output label can be in the form of an encrypted output entry that represents the output value corresponding to the input values. A symmetric encryption key can be used to encrypt the output value. The order of the inputs and their corresponding encrypted output are then permuted such that they are placed into a random order to hide the values from the evaluator. The resulting garbled table that represents the garbled circuit includes, for a two input gate, four resulting ciphertexts in a random order and each ciphertext includes an input label for each input and the encrypted output for the pair of values represented by the two input labels.

The garbler sends the garbled circuit, e.g., in the form of a garbled table for each gate, to the evaluator. The evaluator can also send the random labels for the input values held by the garbler. For example, if the garbler's secret share of an input to a gate has a value of 1, the garbler can send the label for that input corresponding to the value of one to the evaluator. Since the label is random, the evaluator does not learn anything from the labels.

As the evaluator also needs the labels for the secret shares held by the evaluator, the evaluator obtains those labels from the garbler using oblivious transfer. Using oblivious transfer, the garbler does not learn anything about the input values held by the evaluator. At this point, the evaluator has the garbled table for each gate and the input labels for each gate. Using this information, the evaluator can find the output label (e.g., the encrypted output) for each gate that corresponds to the actual input values (e.g., the combination of the secret shares for the inputs to that gate).

The garbler knows the mapping of the output value to the Boolean value, but the evaluator does not. To obtain output value for a gate in cleartext, the evaluator can share the output label with the garbler or the garbler can share the mapping with the garbler. In the techniques described herein, this step may not be performed as neither computer in the MPC cluster 130 should learn anything about the user and this information may be presented by at least some of the inputs to the gates of the garbled circuit.

Multiple garbled circuits can be evaluated to determine the eligibility of digital components. A first garbled circuit can be generated and evaluated to generate the secret shares of the publication condition parameter for each digital component. A second garbled circuit can also be generated and evaluated to evaluate the eligibility expressions for the digital components. The second garbled circuit uses the results of the first garbled circuit(s).

For example, in response to a digital component request, each DSP 150 that receives the digital component request can generate a first garbled circuit based on the publication condition for each of its digital components and data used to evaluate the conditions, such as secret shares of user data, as described in more detail below. Each DPS 150 can then send its first garbled circuit to MPC 1, which evaluates the first garbled circuit. As described below, oblivious transfer techniques can be used as part of this secure MPC process to evaluate the garbled circuits. The result of each evaluation is a first secret share of the publication condition parameter for each digital component of the DSP 150 held by (e.g., stored by) the DSP 150 and a second secret share of the publication condition parameter for each digital component held by MPC1. The second secret share of the publication condition parameter for a digital component can be the label of the output of the portion of the first garbled circuit for that digital component. The first secret share of the publication condition parameter for a digital component can be the label of the output of the portion of the first garbled circuit for the digital component.

MPC1 can then generate a second garbled circuit based on the second secret shares of the publication condition parameters for the digital components of the DSPs 150 that received the digital component request and additional data, e.g., additional conditions such as the eligibility expressions described above, user data, and/or other data. MPC1 can send the second garbled circuit to MPC2, which evaluates the second garbled circuit. The result of this evaluation is a first secret share of an eligibility parameter for each digital component held by MPC1 and a second secret share of the eligibility parameter for each digital component held by MPC2. The second secret share of the eligibility parameter for each digital component can be the label of the output of the portion of the second garbled circuit for the digital component. The first secret share of the eligibility parameter for each digital component can be the value of the label of the output of the portion of the second garbled circuit for the digital component.

MPC1 and MPC2 can perform private information retrieval (PIR) techniques based on the secret shares of the eligibility parameters and selection values for the digital components to obtain secret shares of a selection result that indicates a selected digital component that is selected from among those having an eligibility parameter that indicates that the digital component is eligible. MPC1 and MPC2 can provide the secret shares of the selection result to the client device 110 from which the digital component request was received. The client device 110 can combine the secret shares to access the selected digital component in cleartext.

Figure 2:
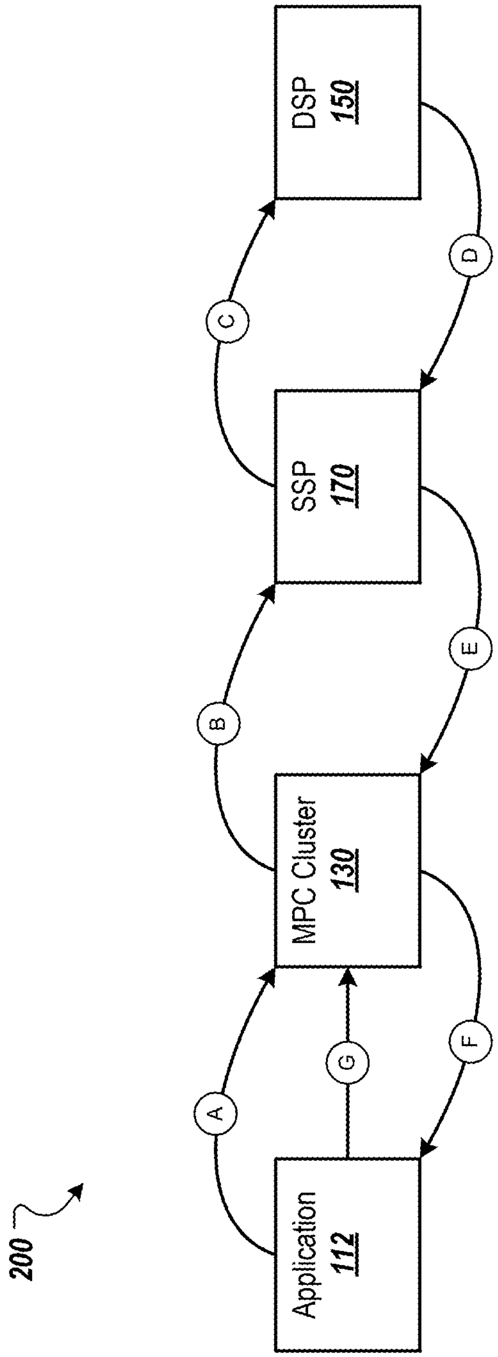
FIG. 2 shows an example data flow within the environment of FIG. 1.

FIG. 2 shows an example data flow 200 within the environment 100 of FIG. 1. This description includes two types of selection values: selection values that are conditioned on either sensitive user information, such as user group membership or other business sensitive information, or parameters whose changes in value can allow unscrupulous parties to infer the sensitive information, or "conditional selection values"; and selection values that are not conditioned on sensitive information, or "unconditional selection values." To protect user privacy, the conditions for "conditional selection values" are evaluated within MPC cluster 130 instead of SSP 170 or DSP 150 to determine whether "conditional selection values" are candidates for the digital component selection process.

This structure allows the MPC cluster 130 to protect user privacy and business confidential information, and to prove its trustworthiness to application providers, such as a provider of application 112. In this example, the MPC cluster 130 relies on secure 2-Party computation (2PC) architecture, which applies cryptography techniques to guarantee that, if at least one of the two computing systems of the MPC cluster 130 is honest, there is no leaking of confidential user data or business confidential information. If the MPC cluster 130 includes more than two computing systems, the current MPC protocol can be expanded, or other MPC protocols can be used.

The MPC cluster 130 runs the secure 2PC protocol to evaluate and apply conditions to evaluate the eligibility of candidate digital components, conduct selection processes to select a digital component based on selection values, and to receive impression and user interaction (e.g., digital component selection) notifications to update parameters on which those conditions depend. All or at least some of these processes are performed using the secure 2PC and secret sharing techniques.

In stage A, an application 112, e.g., in collaboration with a triggering element from a content platform, such as SSP 170, sends a request for a digital component to the MPC cluster 130. The application 112 can include multiple requests for digital components together into one combination request to fetch multiple digital components. The MPC cluster 130 can then serve each request in the combination request independently, or make one or more selection decisions holistically. In this example, the request is for a single digital component, and includes a request for a digital component that is selected based on sensitive information or a digital component that is selected without using sensitive information. The MPC cluster 130 can respond to the request by selecting a particular digital component corresponding to a particular selection value from among a set of digital components that are each mapped to a respective selection value. These selection values and their digital components can be selections values that were previously cached, or otherwise stored, at the MPC cluster 130 and/or selection values generated by a platform, such as DSP 150 or SSP 170, as just-in-time (JIT) selection values. JIT selection values are generated directly in response to need, and increase efficiency and decrease waste, because the selection values are only generated when a digital component is needed. For example, JIT selection values can be generated when a digital component slot becomes available—this is indicated by the receipt of a request for a digital component. Thus, the MPC cluster 130 can select a digital component from a set of digital components that include stored digital components for which information is stored at the MPC cluster 130 and digital components for which JIT selection values are received for the current digital component request.

In some implementations, the selection value for a digital component can be determined using two or more vectors. The MPC cluster 130 can store, for a digital component, a first vector of values that can be used to determine a selection value for the digital component. The first vector of values can be used to determine a selection value for the digital component when a digital component is being selected. Thus, the first vector of values can also be referred to as a digital component-based vector. The digital component-based vector can include multiple elements across two or more dimensions and each element can represent a particular feature of a digital component presentation opportunity. For example, the digital component-based vector of values can include elements for geographic locations or regions associated with the digital component, spoken languages, ages or age ranges to which the digital component is relevant, particular URLs of web pages or other electronic resources, particular products or services, whether a digital component will perform well when it is displayed above or below the fold, the type of digital component, the size of the digital component, the time of day when the digital component is most appropriate to be displayed, and/or other appropriate features of the digital component. In some implementations, e.g., implementations that adopt neural networks, the digital component-based vector of values can be an embedding of user group and other user and/or digital component signals in some abstract vector space.

The value of each element can reflect an amount to increase or decrease a selection value for the digital component based on a current digital component presentation opportunity having the feature corresponding to the element. For example, if a DSP 150 wants the digital component to be displayed to users in Atlanta, but not users in Dallas, the value for an element for Atlanta can be a positive value above a value of one, and the value for an element for Dallas can be a positive value below one, e.g., zero, or a negative value. As described in more detail below, the values of the digital component-based vector can be part of a vector dot product computation to determine a selection value for the digital component.

The digital component request can include information used in a digital component selection process, including information that can be sensitive, such as user group identifiers for user groups to which the application 112 is mapped or otherwise associated, and information that is not sensitive, such as contextual signals (e.g., contextual properties of an environment in which a selected digital component will be displayed) from the application 112 regarding the context in which the digital component will be presented and/or displayed. As described in further detail below, the design of system 110 improves the protection of user data that can be sensitive or confidential.

The triggering element can be, for example, a tag that detects the presence of a digital component slot within an electronic resource (e.g., web page or application content or page). The triggering element can be placed, for example, at the resource and can inform the application 112 of the presence of a digital component slot for which a digital component should be requested.

In stage B, the MPC cluster 130 transmits a digital component request that is based on information that is not sensitive, such as contextual signals, to SSP 170. This request is referred to as a "contextual request." The contextual request can contain various contextual signals and non-sensitive user information gathered directly by the resource (e.g., using scripts or other code) or a provider of the resource (e.g., a content publisher) that triggered the request for a digital component. For example, the contextual signals can include analytics data, language settings, coarse geographic information indicating a coarse location of the client device 110 and other data that assist the content publisher with providing a good user experience. The contextual request provided to SSP 170 does not, however, include sensitive information, such as user group identifiers that identify user groups that include the user as a member.

In stage C, the SSP 170 forwards the contextual request to one or more DSPs 150. In this particular example, and for simplicity, the SSP 170 forwards the contextual request to a single DSP 150. For example, SSP 170 can forward the contextual request to DSP 150. In this example, DSP 150 has digital components and selection values mapped to the digital components, or can determine a selection value for a digital component using the contextual signals.

In stage D, the one or more DSPs 150 return selection values in response to the contextual request. For example, DSP 150 returns one or more selection values mapped to digital components responsive to the contextual request. The DSP 150 can return the selection values in the form of digital component selection items that include the selection value, additional information for the digital component, and optionally the digital component itself, e.g., in the form of a creative. The DSP 150 can return any number of selection values for corresponding digital components responsive to the contextual request.

In some implementations, DSP 150 can additionally return selection values responsive to a digital component request based on sensitive information, such as user group information, but not based on the user group information of the current user as this information is not provided to the DSP 150. These selection values are "conditional selection values" because they are conditioned on sensitive information, and thus are conditioned on the MPC cluster 130 receiving a request that includes sensitive information matching the sensitive information on which the selection values are conditioned. In other words, the MPC cluster 130 can determine whether the user group information of a user corresponding to a digital component request matches the user group information for these conditional selection values.

For each selection value that DSP 150 provides, DSP 150 optionally includes information such as a time-to-live (TTL) parameter, i.e. the maximum timespan that the MPC cluster 130 may cache or otherwise store the selection value, e.g., store the digital component selection item. This TTL parameter enables the MPC cluster 130 to cache selection values received from DSP 150. In some implementations, without a TTL parameter, the MPC cluster 130 does not cache received selection values, and instead will discard the selection values after the selection values have been used in a selection process, e.g., in the selection process corresponding to the digital component request transmitted in stages A, B and C. If the digital component selection item is stored by the MPC cluster 130, the MPC cluster 130 can include the digital component selection item in future digital component selection processes for future digital component requests received from client devices.

The DSP 150 can also provide, e.g., as part of a digital component selection item, an eligibility expression and its corresponding conditions that must be met for the digital component selection item to be a candidate for selection. This information can be provided in cleartext or in shares, e.g., secret shares, depending on the target level of privacy protection and/or target level of data security. If secret shares are used, the DSP 150 can provide, to the SSP 170, a first secret share of the eligibility expression and a first secret share of the condition data for each condition. The DSP 150 can also provide, to the SSP 170, a second secret share of the eligibility expression and a second secret share of the condition data for each condition. The SSP 170 can provide the first secret shares to MPC1 and the second secret shares to MPC2 such that neither MPC1 nor MPC2 has access to either piece of information in cleartext absent unauthorized collusion.

When vectors are used to determine the selection value, the DSP 150 can generate and return a second vector of values. The DSP 150 can generate the second vector of values based on the contextual signals of the digital component request transmitted in stage B and C. The second vector can be referred to as a contextual vector. The contextual vector can include the same elements corresponding to the same features as the digital component-based vector. However, the DSP 150 can determine the values of the contextual vector for the current digital component request based on the contextual signals of the digital component request. In contrast, the values of the digital component-based vector of the DSP 150 is stored as the MPC cluster 130 and is determined ahead of time, e.g., based on the user group(s) corresponding to the digital component-based vector.

For each DSP 150 that provides a contextual vector, the MPC cluster 130 can determine the selection value for each stored digital component of the DSP 150 by determining a dot product of the digital component-based vector and the contextual vector provided by the DSP 150. If the DSP 150 has multiple digital component-based vectors stored by the MPC cluster 130, e.g., each for a different digital component, the MPC cluster 130 determine, for each digital component-based vector, the dot product of the contextual vector and the digital component-based vector.

In some implementations, a third vector can be used based on a user profile of the user for which the digital component request is submitted. This vector can have the same dimensions and features as the other vectors, but with values based on a user profile for the user.

For example, the value for a location element for Austin in the user profile vector can have a positive value if the user is in Austin or a negative value or value of zero if the user is not in Austin; the value for the same location element in the contextual vector can have a positive value if the publisher content currently shown to the user is highly relevant to Austin; the value for the same location element in the digital component-based vector for the digital component is positive if the digital component is relevant to Austin. To calculate the dot product of three vectors, the computing systems $MPC_1$ and $MPC_2$ first perform element-wise multiplication among corresponding elements, one from each of the three vectors, then sum the result. For example, assuming that the three vectors are $V_1=\{v_{1,1} \ldots v_{1,n}\}$, $V_2=\{v_{2,1} \ldots v_{2,n}\}$ and $V_3=\{v_{3,1} \ldots v_{3,n}\}$ respectively, the dot-product among the three vectors would be $$\sum_{i=1}^{n} v_{1,i} \times v_{2,i} \times v_{3,i}.$$

In stage E, the SSP 170 receives the digital component selection items from the DSP 150 and provides the digital component selection items to the MPC cluster 130. In some implementations, the SSP 170 can process the digital component selection items prior to sending the digital component selection items to the MPC cluster 130.

In stage F, the MPC cluster 130 updates its cache with JIT selection values received that enable caching (i.e., have TTL values). In addition, the MPC cluster 130 applies selection rules, such as user group membership rules, frequency control, pacing rules, and rules to prevent micro-targeting of a particular user to all selection values received in stage E, as well as to previously cached selection values to identify eligible digital components for the selection process. For example, the MPC cluster 130 can evaluate the eligibility expressions for each digital component. In some implementations, the JIT digital components that have conditions that are evaluated by the MPC cluster 130 can be ignored for the current digital component selection process. For example, ignoring these digital components for the current selection process can provide performance benefits, e.g., reduced latency in selecting and providing a digital component. The MPC cluster 130 then runs the final selection process among all eligible digital components, selects a winning digital component, and then returns data for selected digital component to the application 112 in response to the digital component request. The application of the rules and selection of the digital component can be performed using a secure MPC process using secret shares, as described below.

In stage G, the selected digital component is rendered by application 112. Application 112 then provides an impression notification to the MPC cluster 130. This impression notification includes data that allows the MPC cluster 130 to update information relevant to updating parameters that allow the MPC cluster 130 to enforce selection rules for future digital component requests, e.g., received in subsequent occurrences of stage A. In some implementations, application 112 may provide an interaction notification to the MPC cluster 130 when the user interacts with the digital component, such as clicking on the digital component. In some implementations, application 112 may send the impression or interaction notification G to MPC cluster 130 by piggy-back on top of a future component request A to reduce the number of network communications and battery/bandwidth consumption for mobile devices, as well as processing/computational costs for the MPC cluster 130.

Figure 3:
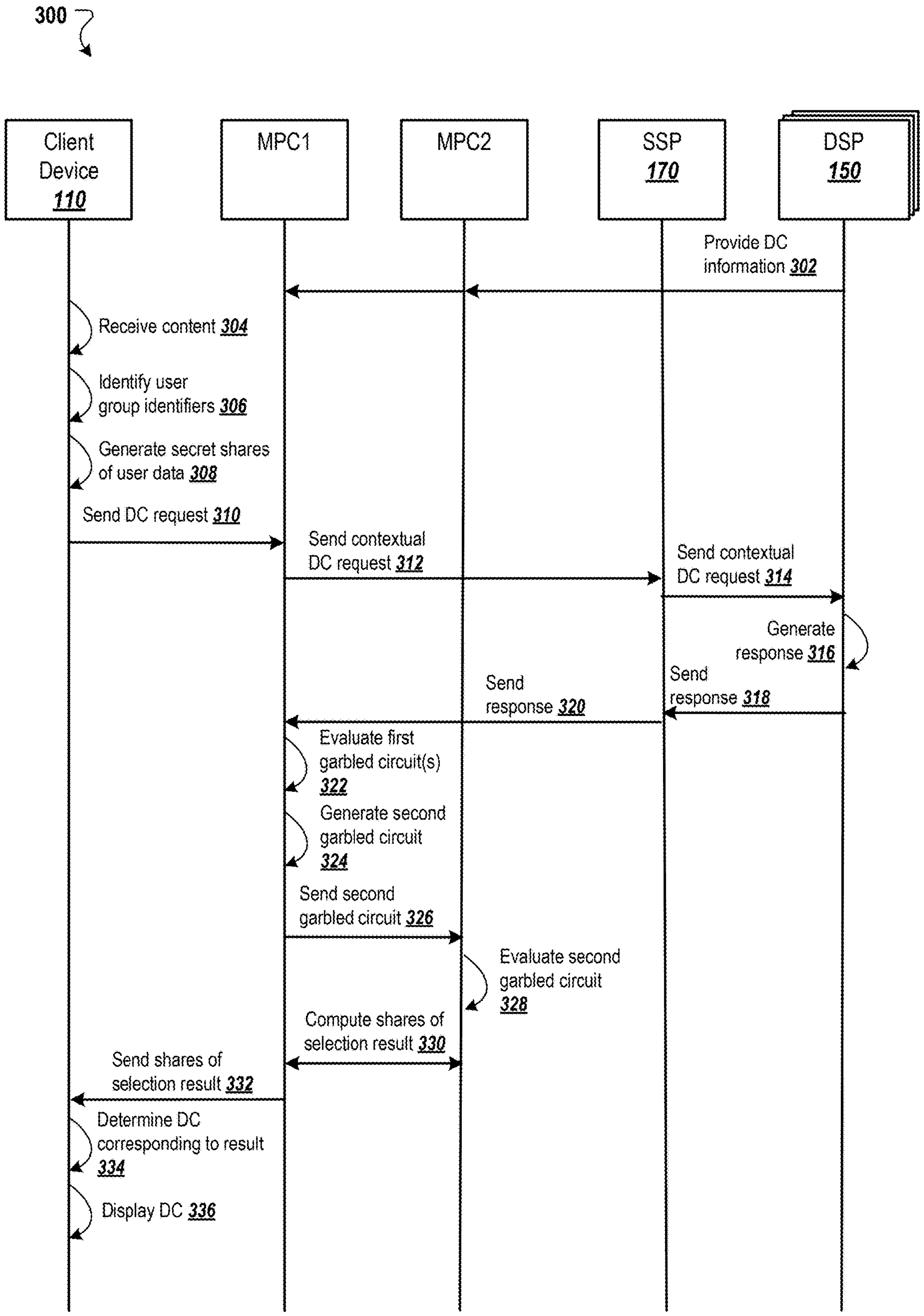
FIG. 3 is a diagram of an example process for selecting a digital component for distribution to a client device.

FIG. 3 is a swim lane diagram of an example process 300 for selecting a digital component for distribution to a client device. Operations of the process 300 can be implemented, for example, by the client device 110, the computing systems MPC1 and MPC2 of the MPC cluster 130, and DSPs 150. Operations of the process 300 can also be implemented as instructions stored on one or more computer readable media which may be non-transitory, and execution of the instructions by one or more data processing apparatus can cause the one or more data processing apparatus to perform the operations of the process 300. Although the process 300 and other processes below are described in terms of a two computing system MPC cluster 130, MPC clusters having more than two computing systems can also be used to perform similar processes. In addition, operations of the process 300 can be implemented by SSPs 170.

The DSPs 150 provide information for digital components (302). This information can include selection values, the digital components themselves, and additional information (e.g., eligibility expressions and/or condition data for conditions) for the digital components. In some implementations, the DSPs 150 provide the selection values and additional information to the MPC cluster 130 via the SSP (not shown in FIG. 3 for brevity). For example, the DSPs 150 can provide the selection values and additional information in response to digital component requests and designate the digital components corresponding to the selection values as stored digital components that should be stored at the MPC cluster 130.

As described above, a DSP 150 can provide one or more digital component selection items for one or more digital components to the MPC cluster 130. Each digital component selection item can have a corresponding digital component, a selection value, and the other information described above. To provide different selection values for different contextual environments, the DSP 150 can provide multiple digital component selection items for the same digital component, where each digital component selection item can have a different eligibility expression, different conditions, and/or different selection values. The MPC cluster 130 can store, e.g., in high-speed memory, such as a cache, the digital component selection items for future digital component requests received from client devices 110.

In some implementations, a DSP 150 can provide a digital component-based vector of values for a digital component instead of a static selection value for the digital component. In such examples, the digital component-based vector of values can be stored in place of the selection value.

The client device 110 receives content (304). For example, the client device 110 can receive an electronic resource (e.g., web page or application content) for display by a web browser or native application. The content can include one or more digital component slots that include computer-readable code, e.g., scripts, that, when executed, cause the client device 110 to request a digital component for each slot. The client device 110 can render the content on a display of the client device 110.

The client device 110 identifies a set of user group identifiers (306). The set of user group identifiers can be the user group identifiers for the user groups that include the user of the application 112 or client device 110 as a member. For example, the set of user group identifiers can be the user group identifiers in the user group list. The application 112 that renders the content or a trusted program can identify the set of user group identifiers, e.g., by accessing the user group list from secure storage of the client device 110.

In some implementations, a user can specify a block list of digital component providers. The block list can include digital component provider identifiers for digital component providers from which the user does not want to receive or view digital components. The digital component request can include secret shares of the identifiers in the user group list and/or the identifiers in the block list.

The client device 110 can also identify other user data that can be sent along with a digital component request, such as user profile data that can include user attributes for the user, e.g., the user's age, interests, etc. As described above, the user can be provided controls that enable the user to control the data that is provided from the client device 110. Each item of user data can be referred to as a user signal. For example, each user group identifier can be a user signal and each user attribute can be a user signal.

The client device 110 generates secret shares of each user signal (308). The client device 110 can generate a first secret share of each user signal for the content platforms and a second secret share of each user signal for MPC1. In some implementations, the client device 110 can generate a first vector that includes the first secret shares of the user signals and a second vector that includes the second secret shares of the user signals.

As the digital component request is going to be sent to MPC1, the client device 110 can encrypt the first secret shares (e.g., by encrypting the first vector) using an encryption key (e.g., public key) for which the DSP 150 that will receive a digital component request has a decryption key (e.g., private key). In this way, the client device 110 does not have to send a separate request to each DSP 150 that will receive a request while also preventing MPC 1 from accessing the first secret shares in cleartext. If multiple DSPs 150 will receive a digital component request, the client device 110 can encrypt the first secret shares for each DSP 150 using an encryption key of that DSP 150.

In some implementations, to securely and efficiently generate a digital component request based on user data, the client device 110 can use probabilistic data structures, such as a cuckoo filter or a Bloom filter, to encode the user signals. In this example, the client device 110 can generate respective secret shares of the Bloom filter for the DSP 150 and MPC1.

The client device 110 generates and transmits, to MPC1, a digital component request (310). The digital component request can include contextual data related to the context in which a selected digital component will be displayed, e.g., contextual properties of an environment in which a selected digital component will be displayed. The contextual data can include data about the resource with which the digital component will be displayed, data about the application 112 that will display the digital component, data about the client device 110, and/or general contextual data (e.g., date and time of day).

The data about the resource can include the URL of the resource, the topic of the resource, the number of digital component slots of the resource, the types of digital component slots, the location(s) within the resource of the digital component slots, etc. The data about the application 112 can include the name of the application (e.g., a particular web browser or native application), the category of application (e.g., browser, video streaming application, maps application, etc.), and/or other appropriate data about the application 112. The data about the client device 110 can include coarse geographic location information that indicates a general area of the client device 110 (e.g., city, state, postal code, etc.), the type of client device 110, the size of the client device's display, etc.

The digital component request can also include the secret shares of the user signals. As some or all of the contextual and/or user data can be considered private, the client device 110 can transmit the data using encryption or other techniques to prevent any unauthorized entity from obtaining such information.

MPC1 sends a contextual digital component request to the SSP 170 (312). This digital component request can include the contextual data, but not sensitive user data in cleartext. For example, the contextual digital component request can include the cleartext contextual data received from the client device 110 and the first secret shares of the user signals that are designated for the DSP(s) 150.

The SSP 170 sends a contextual digital component request to one or more DSPs 150 (314). If the SSP 170 sends the contextual digital component request to multiple DSPs 150, the SSP 170 can parse the received contextual digital component request into separate contextual digital component requests for the DSPs 150. The separate contextual digital component request for each DSP 150 can include the contextual data of the contextual digital component request received by the SSP 170 and the first secret shares of the user signals. If the user signals are encrypted, as described above, the separate contextual digital component request for each DSP 150 can include the encrypted first secret shares that were encrypted using an encryption key (e.g., public key) that corresponds to that DSP's decryption key (e.g., private key). Separating the requests in this way can reduce the data size of each request, resulting in faster transmissions and reduced data being received by each DSP 150 and therefore less processing by each DSP 150.

Each DSP 150 generates a response to the contextual digital component request (314). Each DSP 150 can generate a response to the request that includes one or more conditional selection values for digital components and/or one or more unconditional selection values for digital components. For each digital component, the response can include data identifying the digital component, the selection value for the digital component, and metadata (or other additional information) for the digital component. For example, the response can include a digital component selection item, e.g., a digital component information element dc_information_element, for each digital component. Each DSP 150 can select one or more digital components for inclusion in the digital component selection process based on the contextual signals and determine or identify a selection value for each selected digital component. In some implementations, a DSP 150 can generate a contextual vector for each of one or more digital components based on the contextual signals.

Each DSP 150 can generate a first garbled circuit for determining whether each digital component of the DSP 150 (or at least those that the DSP 150 wants to include in a selection process for selecting a digital component in response to the digital component request) satisfies a publication condition for display of the digital component with the resource for which a digital component is requested by the client device 110.

The DSP 150 can generate its first garbled circuit based on a set of one or more publication conditions, which can each be in the form of a Boolean expression, the first secret shares of the user signals, and/or the contextual data. The garbled circuit can include a garbled table that represents the expression and includes input labels for each gate. The input labels can be based on at least some of the first secret shares of the user signals and/or at least some of the contextual data. For example, if a publication condition is based on user location and URL, the input labels for the gate(s) for this publication condition can be based on the first secret share of the user's location and the URL. The output label for these gates would represent whether a particular digital component is eligible based on the publication condition and the user's location and URL. The same rule can be applied to multiple digital components and similar gate(s) can be used for each digital component such that the garbled circuit has output labels for each digital component. Similarly, multiple rules can apply to each digital component.

To allow MPC1 and MPC2 to use the evaluation result of the first garbled circuit in a second garbled circuit for evaluating the eligibility of the digital components based on one or more additional conditions, the DSP 150 can provide the value of the publication condition parameter for each output label for each digital component to MPC2 and provide the garbled circuit to MPC1. In this way, neither MPC1 nor MPC2 can access whether a digital component satisfies the publication condition(s) in cleartext. Instead, they can use their respective shares of the publication condition parameters (e.g., the first secret shares are the output labels and the second secret shares are the values corresponding to the output labels) in generating and evaluating the second garbled circuit.

To reduce the number of transmissions over the network 105, the DSP 150 can encrypt the second secret shares (e.g., the values for the output labels) using an encryption key (e.g., public key) corresponding to a decryption key (e.g., private key) of MPC2 and include the encrypted secret shares in the same response that is sent to the SSP 170 and on to MPC1. This prevents MPC1 from having access to the publication condition parameters in cleartext. Thus, the response generated by the DSP 150 can include digital components selected based on the contextual data, the first garbled circuit, the DSP's input labels for the first garbled circuit, and the encrypted second secret shares.

Each DSP 150 sends its response to the SSP 170 (318). The SSP 170 can filter the responses, e.g., to enforce any publisher exclusions to prevent digital components corresponding to particular topics or from particular digital component providers from being presented with resources of the publisher.

The SSP 170 sends the responses, which may only include those that were not filtered by the SSP 170, to MPC 1 (320). MPC1 can send the encrypted secret shares of the publication condition parameters to MPC2.

MPC1 evaluates the first garbled circuit (322). MPC1 can evaluate each first garbled circuit to obtain the correct output label for each digital component, e.g., the output label that corresponds to the values of the input labels of the gate(s) for each digital component. MPC1 can obtain its input labels for the gates of the garbled circuit from the DSP(s) 150 using oblivious transfer techniques. Having both set if input labels enables MPC1 to evaluate the garbled circuit to obtain the output label for each digital component.

MPC1 generates a second garbled circuit (324). MPC1 can generate the first garbled circuit based on the output labels for the publication condition parameters, MPC1's secret shares of the user signals, the eligibility expression for each digital component, and/or any other input data for the eligibility expressions (e.g., contextual data if the eligibility of a digital component is conditioned on the contextual data).

MPC1 can generate the second garbled circuit for digital components of each DSP 150 that provided a response to the digital component request. The second garbled circuit can include gates based on the eligibility expression for each of these digital components and the inputs to these eligibility expressions.

MPC1 sends the second garbled circuit to MPC2 (326). MPC1 can also send its input labels for the second garbled circuit to MPC2. MPC1 can store the output values corresponding to each output label of the second garbled circuit. The output values are first secret shares of the eligibility parameter for each digital component.

MPC2 evaluates the garbled circuit (328). MPC2 can evaluate the second garbled circuit to obtain the output label for each eligibility expression and therefore the output label for each digital component for which can expression is included in the second garbled circuit. The output labels is the second secret share for each digital component.

MPC1 and MPC2 compute secret shares of a selection result that indicates a selected digital component (330). MPC1 and MPC2 can perform a PIR technique to select, from among the eligible digital components (e.g., those having an eligibility parameter that indicates that the digital component is eligible), a digital component having a highest selection value. MPC1 and MPC2 can perform this process such that neither computing system can access which digital components are eligible or which digital component is actually selected.

MPC1 and MPC2 sort the digital components in the set of digital components based on their respective selection values. The selection values can be in cleartext so that the computing systems MPC1 and MPC2 can independently sort the digital components based on their selection values. The digital components can be sorted from highest to lowest selection value.

The second garbled circuit can be configured to output a selection vector that represents the selected digital component. The inputs for the second garbled circuit can include the secret shares of the bits for each condition for each digital component in the set of digital components and the selection value for each digital component. For the three conditions of this example, the inputs can be represented as:

$$MCP1 \leftarrow \{b_{1,i}^0, b_{2,i}^0, b_{3,i}^0\}_{i=i}^n, p_i$$

$$MPC2 \leftarrow \{b_{1,i}^1, b_{2,i}^1, b_{3,i}^1\}_{i=i}^n, p_i$$

Here, the superscript indicates the secret share of the bit such that MPC1 maintains secret share 0 for each bit and MPC2 maintains secret share 1 of each bit, and the subscript indicates the condition number (e.g., 1, 2, or 3) and an index number i for the digital component corresponding to the bit. In this example, condition 1 corresponds to the user's group membership, condition 2 corresponds to the user's block list, and condition 3 corresponds to the pacing condition for each digital component. The set of digital components includes "n" digital components each having a selection value $p_i$. The selection value of each digital component can be maintained by each computing system MPC1 and MPC2 in cleartext.

The secret shares of each bit "b" are secret shares of condition bits for the three conditions. In particular, $$b_{1,i}^0$$

represents secret share 0 of a bit $b_{1,i}$ indicating whether the user's membership matches the user group list for digital component i. For example, each digital component can include distribution criteria that indicates which user groups the digital component is eligible for display. This distribution criteria can be represented as a user group list for the digital component and can include the user group identifier for each eligible group. The secret share 1 for this bit is $$b_{1,i}^1.$$

The secret shares can be XOR secret shares such that $$b_{1,i} = b_{1,i}^0 \oplus b_{1,i}^1.$$

The secret share $$b_{2,i}^0$$

represents secret share 0 of a bit $b_{2,i}$ indicating whether digital component i is on the user's block list. The secret share 1 for this bit is $$b_{2,i}^1.$$

The secret shares can be XOR secret shares such that $$b_{2,i} = b_{2,i}^0 \oplus b_{2,i}^1.$$

The secret share $$b_{3,i}^0$$

represents secret share 0 of a bit $b_{3,i}$ indicating whether digital component i is eligible based on the pacing condition for the digital component. The secret share 1 for this bit is $$b_{3,i}^1.$$

The secret shares can be XOR secret shares such that $$b_{3,i} = b_{3,i}^0 \oplus b_{3,i}^1.$$

As noted above, the condition bits can be computed in other garbled circuits prior to executing the selection vector garbled circuits or their garbled circuits can be part of this selection vector garbled circuit such that the inputs to the selection vector garbled circuit includes the inputs to those garbled circuits and their outputs are inputs to circuits of the selection vector garbled circuit.

The output of the selection vector garbled circuit includes secret shares of a PIR selection vector and can be represented as:

$$MPC1 \leftarrow \{t_i^0\}_{i=i}^n$$

$$MPC2 \leftarrow \{t_i^1\}_{i=i}^n$$

Here, $$(t_1^0 \oplus t_1^1, \ldots, t_n^0 \oplus t_n^1)$$

is a 1-hot IR selection vector which has a value of one in the location of the digital component having the highest selection value among those digital components that are eligible based on the three conditions for the digital component. That is, the value of $t_i$ in the location of the vector corresponding to digital component i indicates whether digital component i is selected in response to the digital component request based on the digital component being eligible and having the highest selection value.

The computing systems MPC1 and MPC2 generate secret shares $$st_1^0 \text{ and } st_1^1$$

of an auxiliary state that will indicate whether the highest eligible bit is still to be found. MPC1 can maintain share $$st_1^0$$

and MPC2 can maintain share $$st_1^1.$$

For each digital component i in the sorted list from highest to lowest selection values, MPC1 and MPC2 evaluate the second garbled circuit that takes as input from MPC1:

$$\{b_{1,i}^0, b_{2,i}^0, b_{3,i}^0, st_i^0\}$$

and from MPC2:

$$\{b_{1,i}^1, b_{2,i}^1, b_{3,i}^1, st_i^1\}$$

and outputs to both MPC1:

$$t_i^0, st_{i=1}^0$$

and to MPC2:

$$t_i^1, st_{i=1}^1,$$

where:

(1)

$$t_i = t_i^0 \oplus t_i^1 = \text{AND}_{j=1}^3 \left(b_{j,1}^0 \oplus b_{j,1}^1\right) \text{ AND } \left(st_1^0 \oplus st_i^1\right),$$

where $t_i$ has a value of 1 if and only if all three condition bits are set and digital component i is the first digital component in the sorted list for which this is true.

(2)

$$st_{i+1} = st_{i+1}^0 \oplus st_{i+1}^1 = \left(st_i^0 \oplus st_i^1\right) \text{ AND } (1 - t_i,$$

where $st_{i+1}$ has a value of 1 if an eligible digital component has not yet been reached in the sorted list and becomes 0 once an eligible item is reached.

Here, "j" represents the condition number (e.g., 1, 2, or 3). During this evaluation of the digital components in the sorted list, MPC1 and MPC2 update the values of the shares $$st_1^0 \text{ and } st_1^1$$

of the auxiliary state after each digital component in the list is evaluated.

The computing systems MPC1 and MPC2 execute a secure MPC protocol to retrieve shares of a selection result for the eligible digital component having the highest selection value (510). The computing systems MPC1 and MPC2 use their shares of the PIR selection vector to retrieve secret shares of data for the digital component, which can be secret shares of the digital component information element dc_information_element for the selected digital component, as described above.

For example, MPC1 and MPC2 each receive a random bit string as its share of the selection vector. The two bit strings will be equal in all bit positions except for one, which corresponds to the digital component that is selected. MP1 and MPC2 each select from their databases the elements corresponding to the bits having a particular value, e.g., a value of one, in their bit strings. When these two bit strings are combined using standard two-server PIR, all but the one bit for the selected digital component cancel.

MPC1 transmits secret shares of a selection result to the client device 110 (322). By sending secret shares of a result for only selected digital components rather than information for all or a large set of digital components similarly reduces latency and consumed bandwidth, processing power, and battery power in transmitting and receiving the result. This also reduces the potential leakage of confidential information of content platforms that submit selection values for digital components to the MPC cluster 130 by limiting the number of digital components for which information is provided to the client device.

The selection result can be in the form of a byte array that includes information about the digital component of the selection digital component selection item. For example, the selection result can be a byte array that includes the digital component and the metadata and/or other additional information for the digital component. The selection result can include the digital component information element dc_information_element for the selected digital component. MPC1 can transmit a first secret share of the selection result to the client device 110 and the computing system MPC2 can send a second secret share of the selection result to the client device 110. To reduce the number of transmissions to the client device 110, MPC2 can encrypt its secret share of the selection result using an encryption key (e.g., public key of the client device 110) and provide the encrypted secret share to MPC2. MPC1 can provide its secret share and MPC2's encrypted secret share to the client device 110.

By sending secret shares of a result for only selected digital components rather than information for all or a large set of digital components similarly reduces latency and consumed bandwidth, processing power, and battery power in transmitting and receiving the result. This also reduces the potential leakage of confidential information of content platforms that submit selection values for digital components to the MPC cluster by limiting the number of digital components for which information is provided to the client device.

The client device 110 determines a digital component that corresponds to the selection result(s) (334). For each selection result for which the client device 110 receives two secret shares from the computing systems MPC1 and MPC2, the client device 110 can determine the selection result from the two secret shares. For example, using additive secret shares for the selection result, the client device 110 can add the two secret shares of the selection result together to obtain the selection result in cleartext. This gives the client device 110 access to the digital component and/or the metadata for the digital component, e.g., the identity of the digital component, the location from which the client device 110 can download the digital component, etc. In some implementations, the byte array includes the digital component itself such that the client device 110 can access the digital component after reconstructing the secret shares of the selection result.

The client device 110 displays the digital component (336). For example, the application 112 can display the digital component with the content received in step 304.

The client device 110 can also transmit one or more event notifications to the MPC cluster 130). For example, assuming that a digital component of the selection result received from the MPC cluster 130 is displayed by the application 112 of the client device 110, the application 112 can transmit an impression notification for a digital component in response to displaying the digital component. In another example, the application 112 can transmit a user interaction notification in response to detecting user interaction, e.g., a selection/click of the digital component.

For user interaction notifications, the application 112 can generate secret shares of a clicked parameter clicked that is a Boolean parameter that can have a value of one if the user interacted with the digital component, or a value of zero if the user did not interact with the digital component within a specified duration of time after the digital component was displayed. Thus, in this example, either value indicates that the digital component was displayed, but a value of one can indicate that the user interacted with the digital component. The application 112 can send, to computer system MPC1, a first notification that includes the $SPID_1$ received from MPC1 and a first secret share [$clicked_1$] of the clicked parameter. Similarly, the application 112 can send, to MPC2, a second notification that includes the $SPID_2$ received from $MPC_2$ and a second secret share [$clicked_2$] of the clicked parameter. In another example, the notification can separately indicate whether the digital component was displayed at the client device 110, e.g., using secret shares similar to the clicked parameter.

The impression and user interaction notifications enable the MPC cluster 130 to update the process variables for a feedback controller used to pace the distribution of the digital component. For example, if the process variable is an impression rate, the MPC cluster 130 can use the impression notification to update a count of the impressions of the digital component (or campaign that includes the digital component). If the process variable is a user interaction rate, the MPC cluster 130 can use the clicked parameter to update a number of user interactions for the digital component (or campaign that includes the digital component). In a particular example, computing system MPC1 can use the $SPID_1$ to obtain the stored data for the selection process and computing system MPC2 can use the $SPID_2$ to obtain the stored data for the selection process. The MPC cluster 130 can then perform a secure MPC process to update the process variables (e.g., impression rate, interaction rate, conversion rate, and/or resource depletion rate) for the campaign of the digital component that was displayed by the application 112. Similarly, the MPC cluster 130 can use the notifications to update counts used to determine whether a digital component satisfies a k-anonymity condition.

Figure 4:
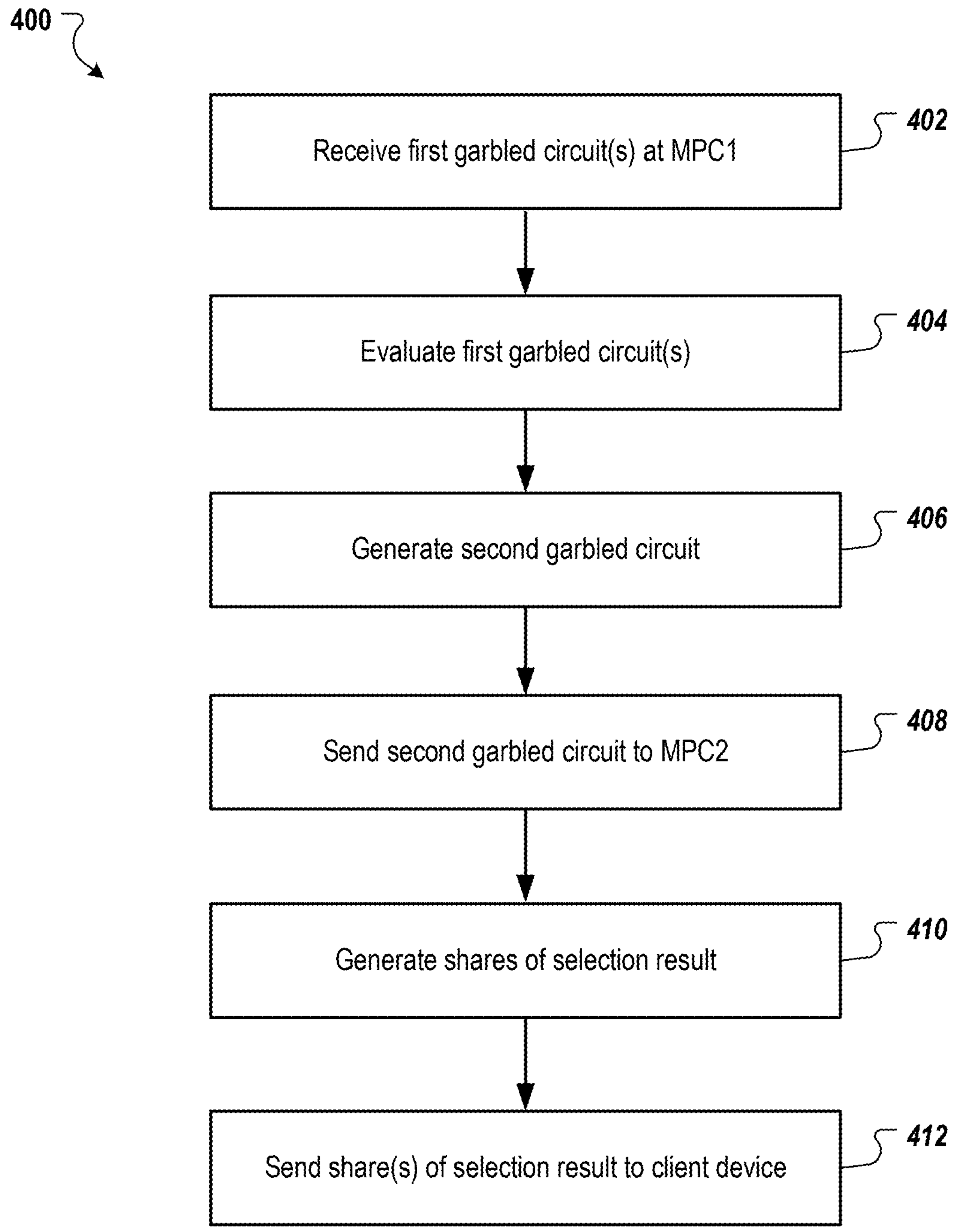
FIG. 4 is a diagram of an example process for selecting a digital component for distribution to a client device.

FIG. 4 is a diagram of an example process 400 for selecting a digital component for distribution to a client device. Operations of the process 400 can be implemented, for example, by computing system MPC1 in collaboration with MPC2 and/r DSP 150. Operations of the process 400 can also be implemented as instructions stored on one or more computer readable media which may be non-transitory, and execution of the instructions by one or more data processing apparatus can cause the one or more data processing apparatus to perform the operations of the process 400. Although the process 400 and other processes below are described in terms of a two computing system MPC cluster 130, MPC clusters having more than two computing systems can also be used to perform similar processes. In addition, operations of the process 400 can be implemented by SSPs 170.

MPC1 receives, from DSP 150, a first garbled circuit for determining whether each digital component of a first set of digital components satisfies a publication condition for display with a resource that is being displayed to a user (402).

MPC1 evaluates the garbled circuit to obtain, for each digital component in the first set of digital components, a first secret share of a publication condition parameter that indicates whether the digital component satisfies the publication condition (404).

MPC1 generates a second garbled circuit for determining whether each digital component in a second set of digital components is eligible for display with the resource (406). MPC1 can generate the second garbled circuit based at least in part on (i) the first secret share of the publication parameter for each digital component in the first set of digital components and (ii) one or more additional eligibility conditions for each digital component in the second set of digital components.

MPC1 sends the second garbled circuit to MPC2 (408). MPC2 is configured to evaluate the garbled circuit to obtain, for each digital component, a second secret share of an eligibility parameter that indicates whether the digital component is eligible for display with the resource. MPC1 stores a first secret share of the eligibility parameter for each digital component.

MPC generates, in collaboration with MPC2 and based at least in part on the first secret share and the second secret share of the eligibility parameter for each digital component in the second set of digital components, secret shares of a selection result that indicates a selected digital component that is selected from a subset of the second set of digital components that are eligible for display with the resource (410).

MPC1 sends a first secret share of the selection result to a client device of the user (412). MPC2 can also send a second secrete share of the selection result to the client device of the user. Or, MPC2 can send an encrypted version of the second secret share of the selection result to MPC1, which can send the encrypted version of the second secret share of the selection result to the client device of the user. The client device can then combine the secret shares to obtain the select result in cleartext. The client device can then display the digital component to the user.

Figure 5:
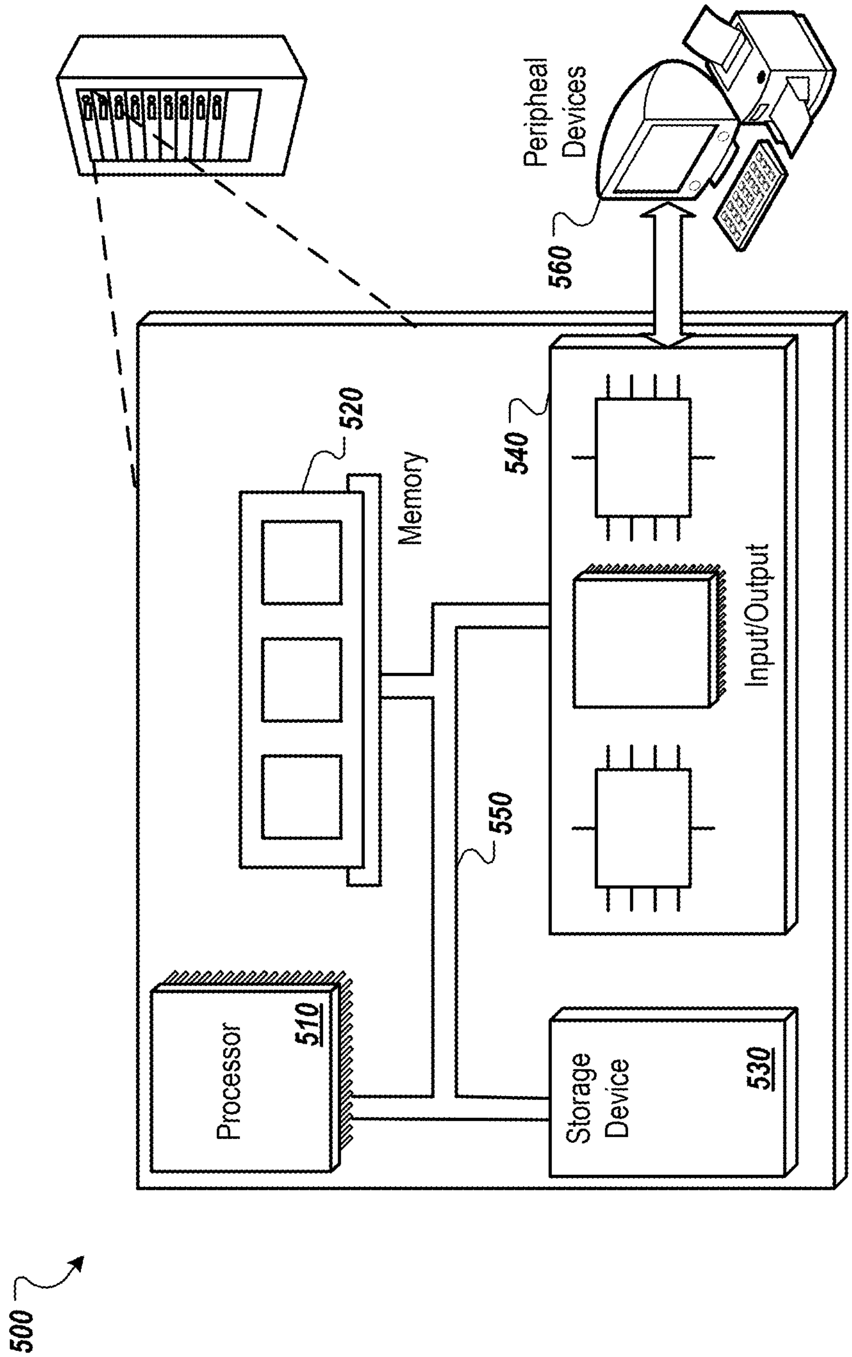
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 400. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other devices, e.g., keyboard, printer, display, and other peripheral devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:

receiving, from a content platform and by a first computer of a secure multi-party computation (MPC) system comprising a plurality of computers, a first garbled circuit for determining whether each digital component of a first set of digital components satisfies a publication condition for display with a resource that is being displayed at a client device of a user, wherein the publication condition comprises a publisher-defined resource restriction rule evaluated against attributes of each digital component of the first set of digital components to determine whether each digital component of the first set of digital components is eligible for display at the client device of the user;

evaluating, by the first computer, the first garbled circuit to obtain, for each digital component in the first set of digital components, a first secret share of a publication condition parameter that indicates whether the digital component in the first set of digital components satisfies the publication condition;

generating, by the first computer, a second garbled circuit for determining whether each digital component in a second set of digital components is eligible for display with the resource, the second garbled circuit being generated subsequent to the evaluating of the first garbled circuit and based at least in part on incorporating (i) the first secret share of the publication condition parameter for each digital component in the first set of digital components as an input to the second garbled circuit and (ii) one or more additional eligibility conditions for each digital component in the second set of digital components;

sending, by the first computer, the second garbled circuit to a second computer of the secure MPC system, wherein the second computer is configured to evaluate the second garbled circuit to obtain, for each digital component in the second set of digital components, a second secret share of an eligibility parameter that indicates whether the digital component in the second set of digital components is eligible for display with the resource, and wherein the first computer stores a first secret share of the eligibility parameter for each digital component in the second set of digital components;

generating, in collaboration with the second computer and based at least in part on the first secret share of the eligibility parameter and the second secret share of the eligibility parameter for each digital component in the second set of digital components, secret shares of a selection result that indicates a selected digital component that is selected from a subset of the second set of digital components that are eligible for display with the resource; and sending, by the first computer, a first secret share of the selection result to the client device of the user.

2. The computer-implemented method of claim 1, wherein the second computer is configured to send a second secret share of the selection result to the client device and the client device is configured to combine the first secret share of the selection result with the second secret share of the selection result to obtain the selected digital component.

3. The computer-implemented method of claim 1, wherein the second computer receives, for each digital component in the first set of digital components, a second secret share of the publication parameter.

4. The computer-implemented method of claim 1, wherein the one or more additional conditions for at least one digital component comprises a user group membership condition that is satisfied when the user is a member of a user group included in distribution criteria for the at least one digital component.

5. The computer-implemented method of claim 1, wherein:

the second secret share of the eligibility result for each digital component in the second set of digital components comprises an output label of a portion of the second garbled circuit for the digital component; and the first secret share of the eligibility result for each digital component in the second set of digital components comprises an output value corresponding to the output label of the portion of the second garbled circuit for the digital component.

6. The computer-implemented method of claim 1, wherein generating secret shares of the selection result that indicates a selected digital component that is selected from a subset of the second set of digital components that are eligible for display with the resource comprises performing a private information retrieval operation to select the selected digital component based on the first secret share and the second secret share of the eligibility parameter for each digital component in the second set of digital components.

7. The computer-implemented method of claim 1, wherein generating secret shares of the selection result that indicates a selected digital component that is selected from a subset of the second set of digital components that are eligible for display with the resource comprises selecting the selected digital component from among the subset of the second set of digital components based on a selection value for each digital component in the subset of the second set of digital components.

8. A non-transitory computer readable storage medium carrying instructions that, when executed by a system, cause the system to perform operations comprising:

receiving, from a content platform and by a first computer of a secure multi-party computation (MPC) system comprising a plurality of computers, a first garbled circuit for determining whether each digital component of a first set of digital components satisfies a publication condition for display with a resource that is being displayed at a client device of a user, wherein the publication condition comprises a publisher-defined resource restriction rule evaluated against attributes of each digital component of the first set of digital components to determine whether each digital component of the first set of digital components is eligible for display at the client device of the user;

evaluating, by the first computer, the first garbled circuit to obtain, for each digital component in the first set of digital components, a first secret share of a publication condition parameter that indicates whether the digital component in the first set of digital components satisfies the publication condition;

generating, by the first computer, a second garbled circuit for determining whether each digital component in a second set of digital components is eligible for display with the resource, the second garbled circuit being generated subsequent to the evaluating of the first garbled circuit and based at least in part on incorporating (i) the first secret share of the publication condition parameter for each digital component in the first set of digital components as an input to the second garbled circuit and (ii) one or more additional eligibility conditions for each digital component in the second set of digital components;

sending, by the first computer, the second garbled circuit to a second computer of the secure MPC system, wherein the second computer is configured to evaluate the second garbled circuit to obtain, for each digital component in the second set of digital components, a second secret share of an eligibility parameter that indicates whether the digital component in the second set of digital components is eligible for display with the resource, and wherein the first computer stores a first secret share of the eligibility parameter for each digital component in the second set of digital components;

generating, in collaboration with the second computer and based at least in part on the first secret share of the eligibility parameter and the second secret share of the eligibility parameter for each digital component in the second set of digital components, secret shares of a selection result that indicates a selected digital component that is selected from a subset of the second set of digital components that are eligible for display with the resource; and sending, by the first computer, a first secret share of the selection result to the client device of the user.

9. The non-transitory computer readable storage medium of claim 8, wherein the second computer is configured to send a second secret share of the selection result to the client device and the client device is configured to combine the first secret share of the selection result with the second secret share of the selection result to obtain the selected digital component.

10. The non-transitory computer readable storage medium of claim 8, wherein the second computer receives, for each digital component in the first set of digital components, a second secret share of the publication parameter.

11. The non-transitory computer readable storage medium of claim 8, wherein the one or more additional conditions for at least one digital component comprises a user group membership condition that is satisfied when the user is a member of a user group included in distribution criteria for the at least one digital component.

12. The non-transitory computer readable storage medium of claim 9, wherein:

the second secret share of the eligibility result for each digital component in the second set of digital components comprises an output label of a portion of the second garbled circuit for the digital component; and the first secret share of the eligibility result for each digital component in the second set of digital components comprises an output value corresponding to the output label of the portion of the second garbled circuit for the digital component.

13. The non-transitory computer readable storage medium of claim 8, wherein generating secret shares of the selection result that indicates a selected digital component that is selected from a subset of the second set of digital components that are eligible for display with the resource comprises performing a private information retrieval operation to select the selected digital component based on the first secret share and the second secret share of the eligibility parameter for each digital component in the second set of digital components.

14. The non-transitory computer readable storage medium of claim 8, wherein generating secret shares of the selection result that indicates a selected digital component that is selected from a subset of the second set of digital components that are eligible for display with the resource comprises selecting the selected digital component from among the subset of the second set of digital components based on a selection value for each digital component in the subset of the second set of digital components.

15. A system comprising:

one or more processors; and one or more storage devices storing instructions that, when executed by the one or more processors, cause the system to carry out operations comprising:

receiving, from a content platform and by a first computer of a secure multi-party computation (MPC) system comprising a plurality of computers, a first garbled circuit for determining whether each digital component of a first set of digital components satisfies a publication condition for display with a resource that is being displayed at a client device of a user, wherein the publication condition comprises a publisher-defined resource restriction rule evaluated against attributes of each digital component of the first set of digital components to determine whether each digital component of the first set of digital components is eligible for display at the client device of the user;

evaluating, by the first computer, the first garbled circuit to obtain, for each digital component in the first set of digital components, a first secret share of a publication condition parameter that indicates whether the digital component in the first set of digital components satisfies the publication condition;

generating, by the first computer, a second garbled circuit for determining whether each digital component in a second set of digital components is eligible for display with the resource, the second garbled circuit being generated subsequent to the evaluating of the first garbled circuit and based at least in part on incorporating (i) the first secret share of the publication condition parameter for each digital component in the first set of digital components as an input to the second garbled circuit and (ii) one or more additional eligibility conditions for each digital component in the second set of digital components;

sending, by the first computer, the second garbled circuit to a second computer of the secure MPC system, wherein the second computer is configured to evaluate the second garbled circuit to obtain, for each digital component in the second set of digital components, a second secret share of an eligibility parameter that indicates whether the digital component in the second set of digital components is eligible for display with the resource, and wherein the first computer stores a first secret share of the eligibility parameter for each digital component in the second set of digital components;

generating, in collaboration with the second computer and based at least in part on the first secret share of the eligibility parameter and the second secret share of the eligibility parameter for each digital component in the second set of digital components, secret shares of a selection result that indicates a selected digital component that is selected from a subset of the second set of digital components that are eligible for display with the resource; and sending, by the first computer, a first secret share of the selection result to the client device of the user.

16. The system of claim 15, wherein the second computer is configured to send a second secret share of the selection result to the client device and the client device is configured to combine the first secret share of the selection result with the second secret share of the selection result to obtain the selected digital component.

17. The system of claim 15, wherein the second computer receives, for each digital component in the first set of digital components, a second secret share of the publication parameter.

18. The system of claim 15, wherein the one or more additional conditions for at least one digital component comprises a user group membership condition that is satisfied when the user is a member of a user group included in distribution criteria for the at least one digital component.

19. The system of claim 15, wherein:

the second secret share of the eligibility result for each digital component in the second set of digital components comprises an output label of a portion of the second garbled circuit for the digital component; and the first secret share of the eligibility result for each digital component in the second set of digital components comprises an output value corresponding to the output label of the portion of the second garbled circuit for the digital component.

20. The system of claim 15, wherein generating secret shares of the selection result that indicates a selected digital component that is selected from a subset of the second set of digital components that are eligible for display with the resource comprises performing a private information retrieval operation to select the selected digital component based on the first secret share and the second secret share of the eligibility parameter for each digital component in the second set of digital components.

* * * * *